United States Patent
Pollard

[15] 3,702,436
[45] Nov. 7, 1972

[54] METHOD AND APPARATUS FOR DATA SIGNAL SPECTRUM ANALYSIS

[72] Inventor: Billy G. Pollard; San Diego, Calif.

[73] Assignee: Spectral Dynamics Corporation, San Diego, Calif.

[22] Filed: Oct. 26, 1971

[21] Appl. No.: 192,492

[52] U.S. Cl. .......................................... 324/77A
[58] Field of Search ................. 324/77A, 77B, 77E

[56] References Cited

UNITED STATES PATENTS

| | | |
|---|---|---|
| 2,997,650 | 8/1961 | Applebaum..............324/77A |
| 3,115,605 | 12/1963 | Coulter....................324/77B |
| 3,281,776 | 10/1966 | Ruehle.....................324/77E |

*Primary Examiner* — Stanley T. Krawczewicz

[57] ABSTRACT

The processing of a data signal for analysis by using a time scale converter that changes the time base or function of the data signal supplied to a single band filter that filters frequencies of interest. The changing of the time base in multiple steps and in successive time intervals, presents different frequencies of the data signal to the filter in the filters constant narrow band. The process and apparatus uses a recirculating memory with a time scale that is changed to allow a programed change in the speed of recirculation. This allows a single band filter or a single degree of freedom filter to in effect scan the range of frequencies of the complex data input signal, even though the signal is transient and not reoccuring.

19 Claims, 4 Drawing Figures

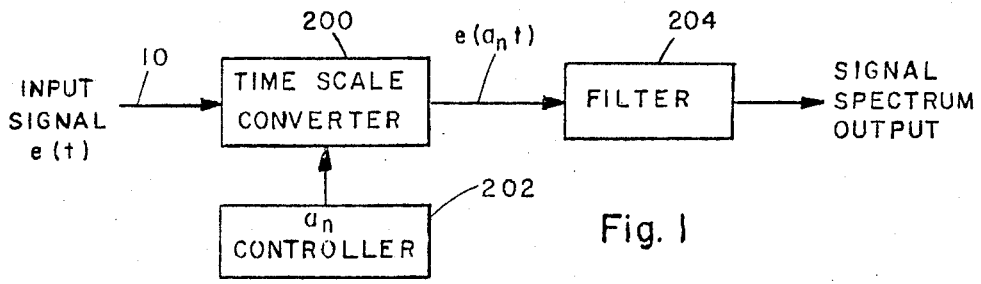
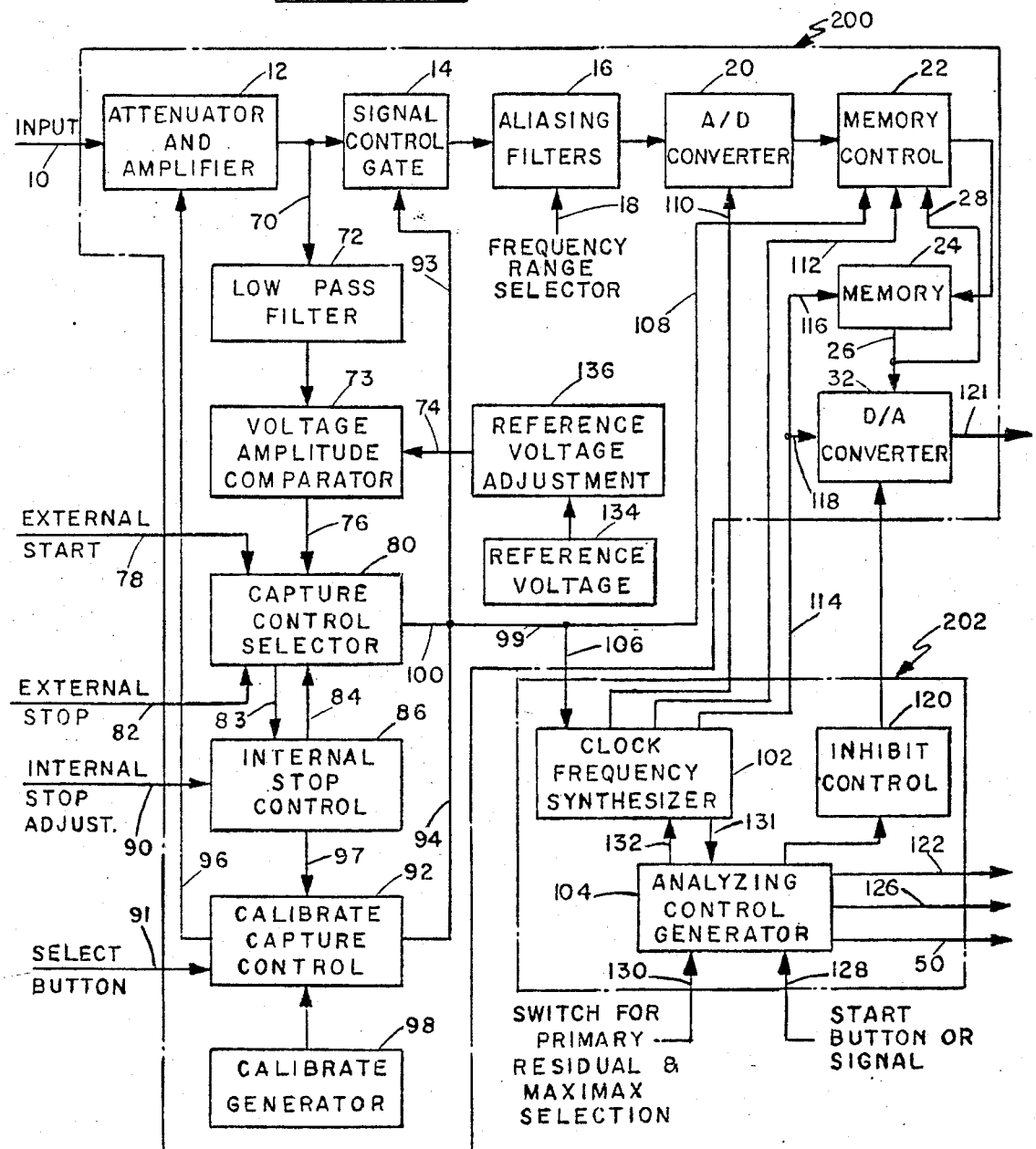

BACKGROUND OF THE INVENTION

In spectrum analysis of complex data signals, it is desirable to analyze the amplitude of particular frequencies of interest in the complex signal. Where the input data signal is a repetitive signal, then there are various techniques for analyzing the input data, such as by heterodyning techniques. However where the input data signal is a nonreoccurring signal such as in analyzing shock signals and the like, then the analyzers normally use a plurality of analyzing filters that separately pass a given frequency of the input signal with the amplitude of the particular plurality of frequency bands processed to determine the desired analysis information. This requires a large number of filters and also does not allow subsequent processing of the nonreoccurring signal. While heterodyning techniques have been used to reduce the number of filters in such analyzers, this method does not lend itself to complete shock spectrum analysis. Thus it is advantageous to have a new and improved method and apparatus for data signal spectrum analysis that is particularly applicable to shock spectrum analysis, which requires primary, residual and maximax shock spectrum data from an input shock transient signal, and that does not require a large number of separate analyzing filters and that also allows the nonrecurring signal to be subsequently or recurringly processed and analyzed.

SUMMARY OF THE INVENTION

In an embodiment of the method and apparatus of this invention, the input data signal, which may be a nonrecurring signal such as a shock transient signal to be analyzed, is fed to a time scale converter. The time scale converter changes the time function of the input data signal in given steps, so that frequencies of interest in the input data signal can be filtered by a single narrow band filter. Thus, subsequent applications of the time function changed data signal to the filter allows the filter to pass each of the frequencies of interest and sequential steps of time function change made in spaced time intervals permit the amplitude of the frequencies in the data signal of interest to be recorded, displayed and otherwise processed for analysis.

In the time scale converter, the input transient signal is captured and stored in a memory unit that permits step and time spaced viewing by the filter of the original input transient signal. The memory unit circulates the transient signal at speeds that are selectively changed by an input memory control signal. With the changing in speed of the memory recirculation, the transient signal output from the memory is changed in temporal speed. These speed changes are programmed on a serial step up or step down basis that allows successive analysis of the frequencies of interest. The filter, which preferably is a single-degree-of-freedom filter, and may be several in number to reduce the required storage capacity of the memory, processes the signals to peak detectors that detect the magnitude of the particular frequency passed by the filter. A multiplexer processes the peak detector outputs to a data processing unit, which in this embodiment comprises an A to D converter that converts the information to digital information that is stored in a memory and later read out for analysis.

Because of the temporal speed up of the input data signal in the memory unit, the nonreoccurring transient signal may be displayed, such as by oscilloscopes or the like, without flicker. Further the continuous recirculation of the transient signal in the memory permits shock spectrum analysis of each of the frequencies of interest, while also permitting the required primary, residual, and maximax shock spectrum analysis. This is accomplished with a reduced number of filters in an overall simplified system in which the particular frequencies of interest to be analyzed, or the frequency range, can be simply changed by changing the rate of processing the data. This eliminates the need for changing of a plurality of filters, as is required in existing systems. Further the filter locations may be readily changed by shifting the time functions and the number of frequencies filtered can be readily increased by increasing the number of time function changes. Also the capability of storing the input transient signal in the memory eliminates the need of repeating the input shock signal for multiple analysis. Still further the memory will hold the transient signal indefinitely and without decay and the memory output may be used for flicker free shock signal oscilloscope displays, since the output is repeated at a much faster rate than the original input rate.

It is therefore an object of this invention to provide a new and improved method and apparatus for data signal spectrum analysis that is particularly applicable to shock spectrum analysis and the spectrum analysis of nonreoccurring or transient signals.

Other objects and many advantages of this invention will become more apparent upon a reading of the following detailed description and an examination of the drawings wherein like reference numerals designate like parts throughout and in which:

FIG. 1 is a block diagram of an embodiment of the invention.

FIGS. 2a and 2b are a more detailed block diagram of the block diagram illustrated in FIG. 1.

Figure 2B:
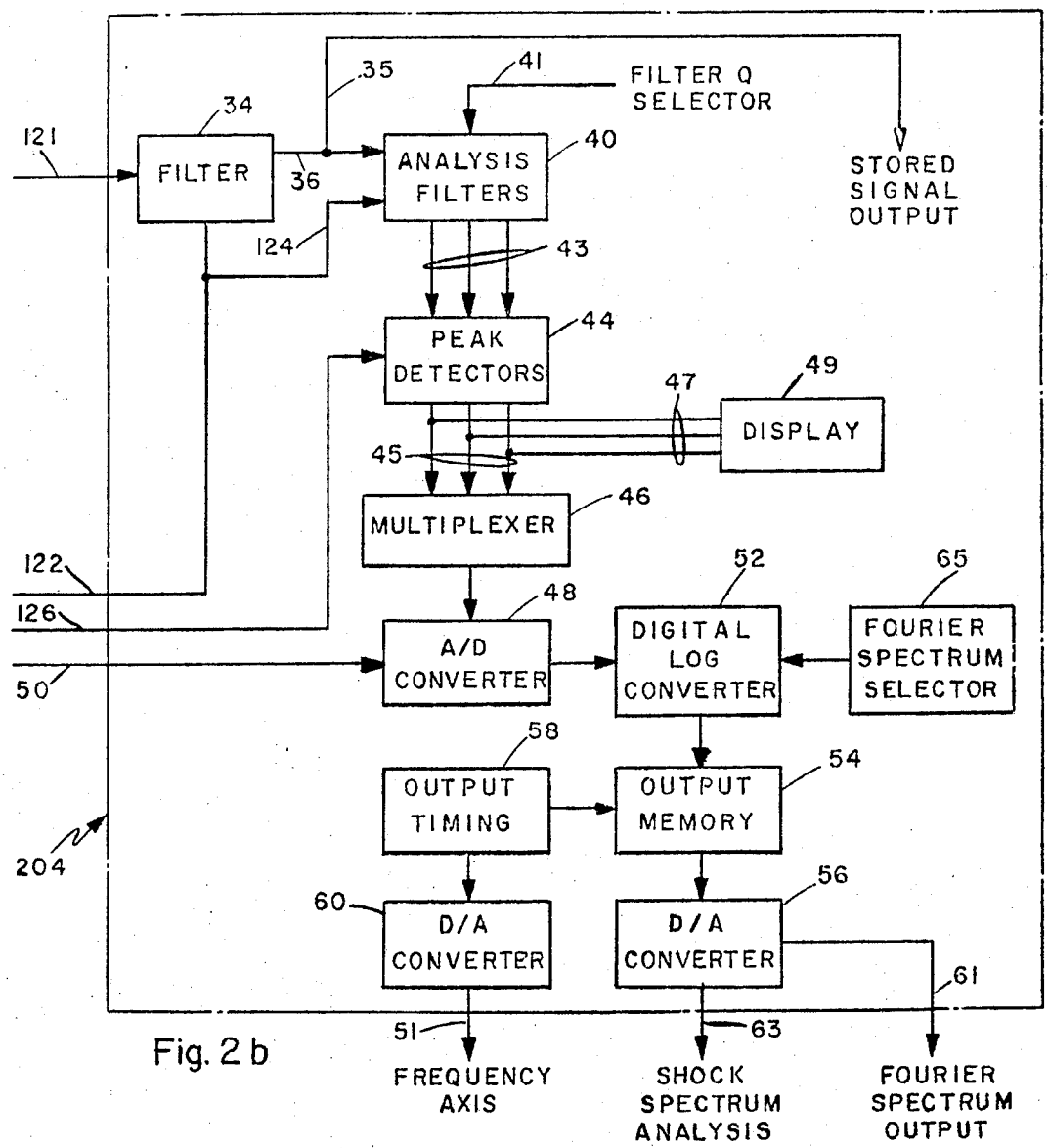

Referring now to the drawings, an input signal in line 10 is fed to a time scale converter 200. The time scale converter functions to store the input transient signal in a memory unit, and then recirculates the signal in the memory unit at different speeds, which speeded up output is applied to a filter 204 for processing. The change in temporal speed of the transient signal by changing the rate of processing the information in the time scale converter, changes the relative frequencies in the transient signal that are applied to the filter Thus the single band filter, through successive applications of the transient signal at different time bases, is able to analyze all the frequencies desired in the transient signal. The controller 202 selectively controls the system and changes the time of memory recirculation in a manner that will be more apparent hereinafter.

Referring now to FIG. 2, an input shock transient signal E(t) is fed to antenuator and amplifier 12 that antenuates or amplifies the input data signal to the desired level. While the processing of a shock transient signal is used in explaining this embodiment, it should be recognized that any data signal can be effectively analyzed by this invention. However the method and apparatus has particular application to the spectrum analysis of shock transient signals. Signal control gate 14 is gated by a signal through line 93, and gates the data signal to the aliasing filter 16. The development of the signal in line 93 that controls control gate 14 will be described in more detail hereinafter.

The aliasing filters function as band limiting filters that limit the upper frequency range of the input signal. These filters are also capable of preserving good transient response in the input signal to the A/D converter 20. A frequency range selector 18 changes the upper band limit of the filters in connection with the analysis of a different frequency range. Also the anti-aliasing filters 16 function to prevent false signals from being generated in the A/D conversion process. The A/D converter changes the data signal from analog to digital, which is fed through the memory control 22 to the memory unit 24. The memory control 22 controls the mode operation of the memory unit 24. Thus in standby mode, no data information is stored. The input data signal is advanced to the memory unit 24, but inhibit control unit 120 provides an inhibit signal to the D/A converter 32 that inhibits the D/A converter 32 from accepting the data signal from the memory output 24. However, the memory output 24 is fed through line 28 to the memory control 22 that that functions as a switch to switch the data in line 28 back into the input of the memory unit 24. After this loading cycle mode, the memory 24 continues to recirculate its readout information back into the memory. The memory unit 24 may be any standard dynamic memory unit that can be externally controlled to load and recirculate at different speeds. In this embodiment, a clock frequency synthesizer 102 provides external control signals through line 114 and 116 to the memory 24 that causes it to change its speed of recirculation. Thus the data signal is fed into the memory unit 24 at real time, and is then recirculated at different speeds depending upon the signals received from the frequency clock synthesizer 102. The A/D converters 20 and 32 receive signals through lines 110 and 118 from the clock synthesizer 102 to correlate the processing of digital data into and out of the memory unit 24.

The analyzing control generator 104 provides control signals that are initiated, for example, through start button or signal 128, which provides a control signal through inhibit control 120 that gates the data signal from the memory unit 24 to the D/A converter 32. The speed or time base or time function of the gated data signal will depend upon the particular speed of recirculation in the memory unit 24. The D/A converter 32 converts the recirculating signal information to an analog signal $e(a_n t)$ that is fed through line 121 to filter 34. Filter 34 removes unwanted high frequency components produced by the digital to analog conversion and passes the signal through line 36 to the analysis filters 40. Thus in line 36 there is an exact replica of the input transient signal but this signal is subject to the control of the time scale factors of the memory unit 24. So the input transient signal $e(t)$ has been converted to $e(a_n t)$. Line 35 allows this particular signal to be removed and stored by any desirable storage means or processed by analysis and displays, if desired, such as by oscilloscopes or the like.

Filters 40 comprise one or more single-degree-of-freedom filters that are required in a shock spectrum analysis. These filters have a relatively narrow bandwidth to pass the particular frequency to be analyzed. In this embodiment, there are three such filters that multiply the total capability of the system three times and thus reduce the required storage capacity of the memory unit 24. The filters 40 provide particular bandpass signal information through lines 43 to the peak detectors 44.

It may be understood at this point that the changing of the speed of recirculation of the memory unit 24 changes the frequency of the individual frequency components of the data signal to be analyzed. Thus by selectively changing the speed or time base of the overall recirculated signal, the frequencies of interest in the input signal are selectively interrogated by the analysis filters 40. As an example, the frequency of the captured signal at the output of the D/A converter 32 in the recirculating mode is determined by the input memory clock frequency MC. If the MC rate during the capture of $e(t)$ was 40 KHz and the MC rate was 400 KHz during the recirculating mode, the frequency of $e(a_n t)$ would be ten times that of $e(t)$. Therefore, the temporal scale factor $a_n'$ of $e(a_n t)$ is determined by the ratio of the recirculated MC to that of the captured MC. Thus if 40 KHz is the frequency at which the data is entered into memory during the capture mode for the 10 KHz frequency range, the $a_n$ is expressed by $$a_n = \frac{\text{Memory Clock Rate}}{40} = \frac{MC}{40}$$

where MC is given in KHz.

The clock frequency synthesizer 102 generates a set of precise memory clock frequencies, MC, from crystal oscillators. From the foregoing equation, it is noted that a unique value of $a_n$ is generated for each crystal frequency. By changing the MC in sequence $m$ times, there will be generated at the input of D/A converter 32, $m$ number of $e(a_n t)$'s expressed by $$e(a_n t) = e(a_n t) \quad \begin{matrix} n = m \\ n = 1 \end{matrix}$$

The $m$ number of time functions defined by the second equation are the exact replicas of the input transient $e(t)$ except for the modified time scale factor changes, $a_n$. For illustrative purposes only, $m$ is taken as 40 in this embodiment. Thus a set of 40 different $a_n$'s will be generated to produce 40 modified time scale functions, $e(a_n t)$. The $e(a_n t)$'s are sequenced one at a time into the single-degree-of-freedom filters in analysis filters 40.

Thus the outputs of the single-degree-of-freedom filters 40 have a unique output for each modified time function $e(a_n t)$. Further the filter output relates precisely to the shock spectrum data obtained by using $m$ number of physical parallel filters. So there is created the equivalent of a new filter location by merely changing $a_n$ an appropriate amount. If $m$ equals 40, 40 filters are created from one filter by sequencing $e(a_n t)$ into the filter input 40 times Since in this embodiment, three filters are used in analysis filters 40, 120 filters are thus synthesized. The three filters employed are normally spaced at one decade frequency intervals. However, they can be set at any desired frequency intervals.

Figure 3:
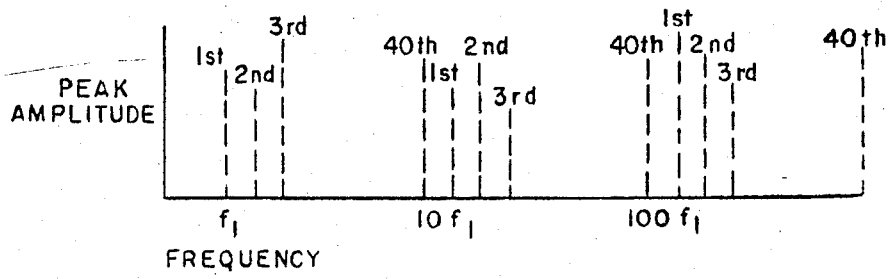
FIG. 3 is a schematic diagram of a frequency versus amplitude analysis of a signal by an embodiment of this invention.

Accordingly it is assumed that $e(t)$ has been captured in the memory 24 and the memory is in the recirculate mode and 10 KHz frequency range is in use. Pressing the analysis initiate control 128 enters the first $e(a_1 t)$ into the three filters of analysis filters 40. The peak detectors 44 are enabled by a signal through line 126 to respond to the appropriate filter outputs through lines 43. The outputs are multiplexed by the multiplexer 46 and then converted by A/D converter 48 to digital information that is stored through digital log converter 52 in output memory 54. The graphical form of the filter output versus frequency of filter location is illustrated in FIG. 3. The dash lines show the filter outputs for $a_2$, $a_3$ and $a_{40}$. The three sets of 40 filters give 120 outputs.

In shock spectrum analysis, it is required that the filters 40 have a zero initial condition before the application of the transient input. Thus lines 124 and 122 reset the system and the filters to the zero initial condition before a new $e(a_n t)$ is received. So while the detector outputs are being multiplexed and stored into the output memory 54, the filters 40 are initialized to zero to be ready for the next input $e(a_2 t)$. Also during this time, as will be more apparent hereinafter, the time scale controller is incremented to provide $a_2$. At the termination of the detector process, the next step $e(a_2 t)$ is automatically initiated by the analyzing control generator 104 sending a signal through line 132 to the clock frequency synthesizer 102. When the $a_{40}$ step is complete, the analysis is complete and the output memory contains the information of 120 filter outputs. At the completion of the 40th step, the time scale converter is reset to the $a_1$ step and is ready for another analysis.

In operation of the memory unit 24 and the analyzing control generator 104 and clock frequency synthesizer 102, there are basicly four operational modes.

1. Standby mode where no information is stored,
2. The loading cycle into the memory mode,
3. The recirculating memory content mode, and
4. The analysis mode.

In these modes, it is necessary to correlate the system for acceptance of the transient signal. This can be by signal amplitude detection control to receive the transient signal and feed it into the memory 24, or it can be externally started and stopped. In the amplitude detection system, a portion of the input transient signal from the antenuator and amplifier 12 is fed through line 70 to low pass filter 72 that removes the high frequency signals for noise rejection and feeds the signal to the voltage amplitude comparator 73. The voltage comparator 73 compares the level of the input signal with a reference voltage in line 74. When the input data signal exceeds the reference voltage in magnitude, then a start signal is fed through line 76 to the capture control selector 80 that feeds a start signal through lines 100, 99 and 106 to energize the clock frequency synthesizer 102, and through line 106 to energize the memory control unit 22. The capture control selector 80 also feeds a signal through line 93 that gates signal gate control 14. This allows the input data signal to pass through to the memory unit 24, where it is stored on a real time basis. Reference voltage adjustment 136 sets the particular level of voltage to which the voltage comparison is made by voltage comparator 73.

The time length of the input signal inserted into memory 24 can be governed by the length of the memory capacity of memory unit 24. However in the analyzer it is normally more desirable to provide other means for providing a stop signal to the capture control selector 80 to close signal control gate 14. This is accomplished by an external stop signal 82 or by a signal through line 84 from an internal stop control 86. Internal stop control 86 comprises a counter that is preset to a given count by internal stop adjustment 90. Thus the counter receives a signal through line 83 starting the count and when a given count has been reached, then a signal is sent through line 84 causing the capture control selector 80 to send a deenergizing signal through line 100. If desired, the capture control selector can also be initiated through an external start signal through line 78.

Once the input data signal is in memory 24, then the loading cycle into memory mode has been accomplished and the input data signal is recirculated in the memory unit 24 in the manner previsously described. To perform an analysis of the data signal, the start button 128 is actuated energizing the analyzing control generator 104. The analyzing control generator 104 feeds a signal through the inhibit control 120 that gates the memory output to the D/A converter 32. The analyzing control generator 104 also sends a signal 132 to the clock frequency synthesizer 102 that starts a sequence of clock frequency signals to the memory control 115, memory 114, A/D converter 20 and D/A converters 32 and 20 that increases the speed of recirculation of the memory 24 in given speed increments in the manner previously described. However each of these steps of frequency or speed increase, are controlled by the analyzing control generator 132 that inhibits the D/A converter through inhibit control 120, to provide a time interval spacing between applications of the successive signals from the memory unit 24 to the filters 40. Also the analyzing control generator through lines 122 and 124 zero the respective filters 34 and 40 as required in initiating these filters for subsequent signal processing as is required in shock spectrum analysis. The analyzing control generator 132 through return line 131 from the synthesizer 102 senses the end of the first level of clock frequency signals fed to the memory 24 and stops the clock frequency synthesizer by a signal control pulse through line 132 from changing the clock frequency signals to the memory unit 22 until the filters 34 and 40 can be zeroed.

The performing of shock spectrum analysis normally requires, by definition, the processing of information for primary analysis, residual analysis, and maximax analysis. In primary analysis the output of the peak detectors 44 are correlated by multiplexer 46 to A/D converter 48 and fed through the digital log converter 52 to output memory 54 that stores the peak amplitude of the respective frequency signals for each of the frequencies analyzed in the manner previously described. This is controlled by the analyzing control generator. In residual spectrum analysis, the residual signal in the analysis filters after the data signal has been processed there-through in the manner previously described, is read through the peak detectors, multiplexers to the output memory 54. In the maximax mode, a measure of the amplitude of each of the foregoing primary and residual output signals is made to provide an output of the one that has greatest magnitude. An output timing unit 58 sends out timing command signals to read out the output memory 54 through a D/A converter 56 that may be plotted with a D/A converter output to provide the frequency versus amplitude analysis of FIG. 3 respective lines 59 and 63.

The system also provides spectral analysis on a Fourier basis by means of the Fourier spectrum selector to the digital log converter 52 that provides Fourier spectrum output through line 61. Fourier spectrum is computed from the residual shock spectrum data in the digital log converter when the Fourier spectrum selector is activated.

The calibrate capture control 92 activated by calibrate selector button 91 provides an input signal as determined by calibrate generator 98 through lines 94 and 96 initiates a calibrate signal through the entire system to provide necessary calibration thereof.

Having described my invention, I now claim.

1. In a spectrum analyzer for analyzing a data signal,
   filter means for filtering a band of frequencies of the data signal,
   time scale converter means for receiving the data signal and changing the time function of the data signal to a different time base data signal that is supplied to said filter means,
   and control means for successively changing the time function of said time scale converter means successively changing the time function of the different time base data signal to said filter.

2. In a spectrum analyzer as claimed in Claim 1 in which,
   said control means having means for providing a plurality of control signals to said time converter means,
   and said time converter means being responsive to said control signals for changing the time function of the different time base data signals in a pattern in which said filter means passes selective frequencies over a range of frequencies in the input data signal.

3. In a spectrum analyzer as claimed in Claim 1 in which,
   the output control signals of said control means to said time scale converter means comprises a plurality of step signals,
   said time scale converter means in response to said step signals providing different step time bases to the different time base data signals,
   and data signal processing means responsive to the output of said filter for correlating the data in the filtered different time base data signal outputs.

4. In spectrum analyzer as claimed in Claim 3 in which,
   said time scale converter means including storage means for storing the data signal and feeding the data signal to said filter means at selected time intervals with the different time bases.

5. In a spectrum analyzer as claimed in Claim 4 in which,
   said storage means including memory means for storing the data signal,
   memory control means for controlling said memory to recirculate the data signal,
   said memory means being responsive to said control signals from said control means for increasing the speed of the recirculation of the data signal,
   and means for supplying the output of said memory means to said filter means.

6. In a spectrum analyzer as claimed in Claim 5 including,
   second data signal processing means for receiving and processing the different time base data signal outputs of said converter means in the unfiltered condition.

7. In a spectrum analyzer as claimed in Claim 6 in which,
   said filter means comprises at least one single-degree-of-freedom filter.

8. In a shock spectrum analyzer as claimed in Claim 6 in which,
   said time scale converter means being responsive to said step signals for serially changing the time base of the data signal in step speed levels so that said filter of said filter means filters from the different time base data signals the frequencies of interest in the data signal through a single, frequency band filter,
   and means for returning said filter of said filter means to zero condition between times of receiving the different time base data signals.

9. In a spectrum analyzer as claimed in Claim 8 in which,
   said time scale converter means including an A/D converter means for converting the analog input data signal to said memory means to a digital signal,
   and D/A converter means for converting the different time base data signal outputs of said memory means to said filter means to analog signals.

10. In a shock spectrum analyzer as claimed in Claim 9 in which,
    said control means including means for providing a clock signal output to said memory means and to said A/D converter and to said D/A converter.

11. In a spectrum analyzer as claimed in Claim 10 in which,
    said data signal processing means including peak detector means for detecting the amplitude peaks of the output of said filter means,
    and means for displaying the output signals of said peak detector means.

12. In a spectrum analyzer as claimed in Claim 11 in which,
    said filter means including a plurality of single-degree-of-freedom filters.
    said data signal processing means including multiplexer means for combining the output of said peak detector means,
    second A/D converter means for converting said output of said multiplexer to a digital output,
    and digital log converter means for converting said output of said second A/D converter to information for analysis.

13. In a spectrum analyzer as claimed in Claim 10 including,
gate means for gating said input data signal to said time scale converter means,
and sensing means for sensing the magnitude of the input data signal and closing said gate means when said input data signal exceeds a predetermined amplitude.

14. The method of analyzing a complex data signal to obtain amplitude data for a plurality of frequencies in the data signal comprising the steps of,
converting the data signal into a plurality of data signals having different time bases,
and filtering each of said different time base data signals by a filter having a single pass band.

15. In the method claimed in Claim 14 including the step of,
setting the time base of each of said different time base data signals to selective time bases that permits the filter to filter separate frequencies of interest in the input data signal.

16. In the method claimed in Claim 15 including the step of,
returning the filter to a zero storage condition between filtering each of the different time base data signals.

17. In the method claimed in Claim 16 including the steps of,
detecting the peak amplitude of each of the outputs of the filter,
and analyzing the amplitude versus frequency of the peak detector outputs.

18. In the method claimed in Claim 17 including the steps of,
inserting the data signal into a memory unit,
and recirculating the data signal in the memory unit at different speeds to provide the different time base data signals.

19. In the method claimed in Claim 18 including the step of,
applying each of the different time base data signals recirculated in the memory means to the filter while continuing to recirculate the data signal at different speeds.

* * * * *